United States Patent
Chaudhuri et al.

(10) Patent No.: US 7,739,269 B2
(45) Date of Patent: Jun. 15, 2010

(54) INCREMENTAL REPAIR OF QUERY PLANS

(75) Inventors: Surajit Chaudhuri, Redmond, WA (US); Ravishankar Ramamurthy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/625,153

(22) Filed: Jan. 19, 2007

(65) Prior Publication Data

US 2008/0177694 A1 Jul. 24, 2008

(51) Int. Cl.
*G06F 7/00* (2006.01)
*G06F 17/30* (2006.01)
(52) U.S. Cl. .................................. 707/718; 707/713
(58) Field of Classification Search .............. 707/2, 707/3
See application file for complete search history.

(56) References Cited

U.S. PATENT DOCUMENTS

| | | | |
|---|---|---|---|
| 5,204,960 A | | 4/1993 | Smith et al. |
| 5,875,334 A | | 2/1999 | Chow et al. |
| 6,026,390 A | * | 2/2000 | Ross et al. ............... 707/2 |
| 6,353,826 B1 | | 3/2002 | Seputis |
| 6,363,371 B1 | | 3/2002 | Chaudhuri et al. |
| 6,738,755 B1 | | 5/2004 | Freytag et al. |
| 2003/0154216 A1 | * | 8/2003 | Arnold et al. ........... 707/104.1 |
| 2003/0229617 A1 | | 12/2003 | Rjaibi et al. |
| 2004/0172321 A1 | * | 9/2004 | Vemula et al. ............ 705/8 |
| 2004/0230942 A1 | | 11/2004 | Garms et al. |
| 2004/0243555 A1 | * | 12/2004 | Bolsius et al. ........... 707/3 |
| 2005/0097078 A1 | * | 5/2005 | Lohman et al. ........... 707/2 |
| 2005/0267866 A1 | * | 12/2005 | Markl et al. ............. 707/2 |
| 2006/0074874 A1 | * | 4/2006 | Day et al. .............. 707/3 |
| 2008/0086444 A1 | * | 4/2008 | Yu et al. ................ 707/2 |

OTHER PUBLICATIONS

Andrei Lopatenko, et al. Complexity of Consistent Query Answering in Databases under Cardinality-Based and Incremental Repair Semantics. http://arxiv.org/PS_cache/cs/pdf/0604/0604002.pdf. Last accessed Nov. 17, 2006.
Leopoldo Bertossi. Consistent Query Answering in Databases. http://www.cs.toronto.edu/~libkin/dbtheory/leo.pdf. Last accessed Nov. 17, 2006.
N. Bruno, et al. Automatic Physical Database Tuning. A Relaxation based Approach. Proceedings of SIGMOD 2005. pp. 227-238.
S. Agrawal, et al. Database Tuning Advisor for Microsoft SQL Server 2005. Proceedings of VLDB 2004. pp. 930-932.

(Continued)

*Primary Examiner*—Apu M Mofiz
*Assistant Examiner*—Cindy Nguyen
(74) *Attorney, Agent, or Firm*—Lee & Hayes, PLLC

(57) ABSTRACT

Database systems use a plan cache to avoid the overheads (e.g., time, money) of query recompilation. Query plans can become invalidated by updates to the statistics on data or changes to the physical database design. Once a plan is invalidated, it can be repaired utilizing one or more of the disclosed embodiments. Incremental repair of query plans includes reusing parts of the current plan rather than discarding the plan entirely when it is invalidated. Repair to an existing query plan is attempted before resorting to full recompilation.

17 Claims, 10 Drawing Sheets

OTHER PUBLICATIONS

S. Chaudhuri, et al. Automating Statistics Management for Query Optimizers. Proceedings of ICDE 2000.
S. Chaudhuri. An overview of Query Optimization in Relational Systems. Proceedings of PODS 1998. pp. 34-43.
P. Glassner, et al. Query Optimization in the IBM DB2 Family. Data Engineering Bulletin. 16(4) 1993. pp. 4-17.
A. Ghosh, et al. Plan Selection based on Query Clustering. Proceedings of VLDB 2002.
G. Graefe. The Cascades Framework for Query Optimization. IEEE Data Engineering Bulletin 18(3) 1995. pp. 19-28.
N. Reddy, et al. Analyzing Plan Diagrams of Database Query Optimizers. Proceedings of VLDB 2005. pp. 1228-1239.
T. Ibaraki, et al. Optimal Nesting for Computing N-Relational Joins. ACM TODS 9(3) 1984. pp. 482-502.
Y. Ioannidis. Query Optimization. ACM Computing Surveys 1996. pp. 121-123.
Y. Ioannidis, et al. Parametric Query Optimization VLDB Journal 6(2) 1997. pp. 132-151.
N. Kabra, et al. Efficient Mid-Query Re-Optimization of Sub-Optimal Query Execution Plans. pp. 106-117.
S. Kirkpatrick, et al. Optimization by Simulated Annealing. Science. 220(4598): 67-683(1983).
R.A. Lorie, et al. The Compilation of a High Level Data Language. IBM Research Report RJ2598 (1979).
A. Marathe. Batch Compilation, Recompilation and Plan Caching Issues in SQL Server 2005. SQLServer WhitePaper.
V. Markl, et al. Robust Query Processing through Progressive Optimization. Proceedings of SIGMOD 2004.
K. Ono, et al. Measuring the Complexity of Join Enumeration in Query Optimization. Proceedings of VLDB 1990.
Program for TPC data generation with skew. ftp://ftp.research.microsoft.com/users/viveknar/tpcdskew.

* cited by examiner

300

LocalRapir (P)
For every Leaf Node PLeaf in the plan P
    L = GetLogicalExpr (PLeaf)
    Prop = GetPlanProperties (PLeaf)
    PNewLeaf = FindBestImplementation (L, Prop)
    Replace (P, PLeaf, PNewLeaf)

Global Repair (P)
    L = GetLogicalExpr (P)
    Prop = GetPlanProperties (P)
    PNew = FindBestImplementation (L, Prop)
    Replace (P, P, PNew)

Local Recompile (P)
    PLCA = computeLCA (P)
    Prop = GetPlanProperties (PLCA)
    L = GetLogicalExpr (PLCA)
    PNewLCA = Optimize (L, Prop)
    Replace (P, PLCA, PNewLCA)

INCREMENTAL REPAIR OF QUERY PLANS

BACKGROUND

Electronic storage mechanisms have enabled accumulation of massive amounts of data. For instance, data that previously required volumes of books for recordation can now be stored electronically without expense of printing paper and with a fraction of physical space needed for storage of paper. Database systems are often employed for storage and organization of data, wherein such databases can be queried by users to retrieve desirable data. Database systems have been widely deployed and applications associated therewith have become increasingly complex and varied.

Complex queries are common in decision support and reporting scenarios. Query optimization tends to be expensive for such complex queries despite development of techniques to cope with such queries. Therefore, many database systems use a plan cache for compiled query execution plans, which helps to mitigate the overhead of repeated recompilation for the most frequently executed queries.

Even if a plan is resident in the cache, it is invalidated by changes to the statistics (or other information) of the base data or through changes in the physical database design such as addition or deletion of an index or changes to other relevant metadata in the system. This is common since changes in statistics on base data and addition of indexes can change the optimal plan selected by an optimizer. Further, removal of indexes used in a plan renders the current plan not executable. Once a plan is invalidated, the query must be optimized again to generate a new query plan. Although plan invalidation and consequent recompilation can be motivated for reasons associated with integrity of the base data, they can lead to a significant expense due to the time and costs of recompilation for complex queries.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with mitigating overhead associated with recompilation of query plans. Repair techniques utilize at least a subset of an existing query plan and such techniques include a local repair, a global repair and a local recompilation. A local repair technique can perform the smallest amount of changes to a query plan to produce a new repaired query plan. Local repair reviews the leaf nodes and provides the best available access methods to leaf nodes. A global repair technique can provide the best available implementation algorithm(s) for operators in a query plan. A local recompilation technique can attempt to mitigate overhead by fully optimizing fragments from the previous plan to derive the new plan.

In some embodiments, repairs are performed until a threshold level is reached or exceeded, at which time a recompile is performed. The threshold level can characterize the amount of updates to a database. In some embodiments, a determination can be made that a recompile should be performed when a repair technique is not adequate to provide the desired results to a user based upon a user request.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 3 illustrates an exemplary algorithm that can be utilized for a local repair technique in accordance with the various embodiments.

FIG. 4 illustrates an exemplary algorithm that can be utilized for a global repair technique in accordance with the one or more embodiments presented herein.

DETAILED DESCRIPTION

Figure 1:
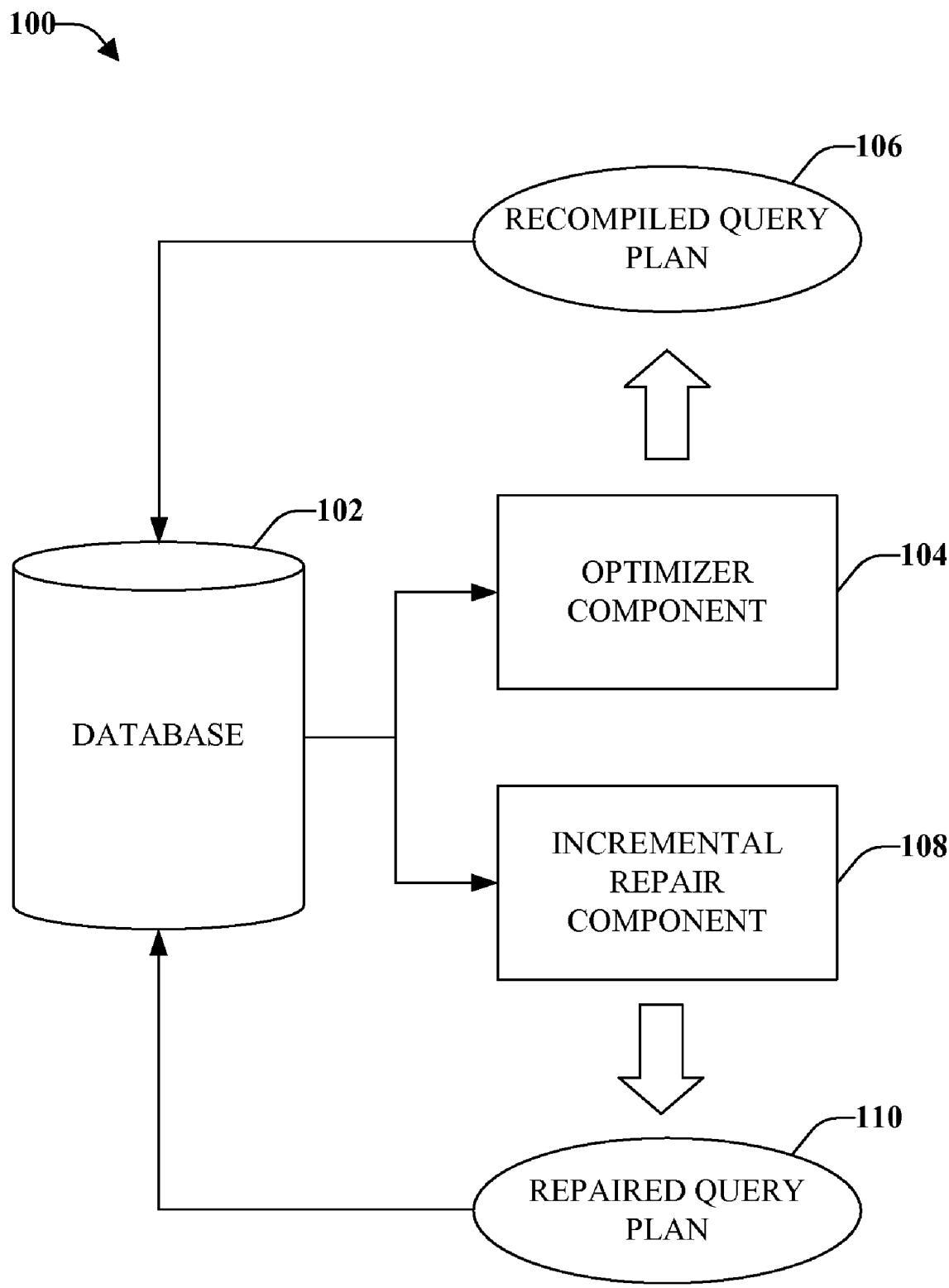
FIG. 1 illustrates a high-level block diagram of a system that facilitates incremental repair of existing query plans.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g. compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices, both wired and wireless.

Referring initially to FIG. 1, illustrated is a high-level block diagram of a system 100 that facilitates incremental repair of existing query plans. The repair or updates can be updates to the statistics of a relation, modifications to the physical database design (e.g., the addition of an index or the deletion of index that is currently used by a query plan), and so forth. System 100 can allow existing query plans to be repaired while mitigating the need for a full recompilation, thus, mitigating the overhead of recompilation. In some embodiments, system 100 can optimize the existing query but restrict the search space based on the existing plan. In other embodiments, system 100 fully optimizes a smaller sub-query to repair the current plan. Additionally or alternatively, system 100 can facilitate initiation of a full recompilation if an incremental repair might be unsuccessful or when a threshold has been met or exceeded. The threshold can be utilized to reflect the amount of update activity to relations in the database.

In further detail, system 100 includes a database 102 that contains data organized by way of tables, wherein the tables include a plurality of columns and rows. For example, the database can include information relating to car purchases, and columns therein can include purchaser names, date of purchase, purchase amount, make of car, model of car, amount financed, and so forth. An accounting department might be interested in compiling information for financing or warranty purposes while a sales department might be interested in compiling information relating to the purchaser demographics, and so forth. Therefore, each department might compile a query and save such query as a query plan, which can be utilized each time the information is desired, without requiring recompilation of the query. However, there might be situations when a query plan is rendered invalid or non-optimal, such as when various data is removed from the database. In these situations, the query can be repaired and/or recompiled, depending on the integrity of the resulting query information. It should be understood that other techniques of organizing data could be utilized with the disclosed embodiments, provided such data can be expressed in the form of rows and columns.

Since there can be a tremendous amount of base data contained in databases resulting in complex queries, once a query is compiled the query can be placed in a plan cache. Plan caches mitigate recompiling the query each time the query is re-executed since optimization is a computationally intensive process that is both time-consuming and expensive. However, there are instances that can trigger recompilations. For example, a plan might be recompiled if it is no longer correct (e.g., there has been a schema change related to the plan). A plan may also be recompiled if there have been sufficient changes to the database, such as changes to the statistics or physical database design, to render the current plan non-optimal. In such instances, an optimizer component 104 can be configured to receive one or more query plans and recompile the plans when they are rendered invalid or non-optimal. The optimizer component 104 can be, for example, a rules-based optimizer or another type of optimizer. In such embodiments, the recompiled query plan 106 can be returned to the plan cache associated with the database 102 and becomes the current or existing plan.

There can be various ways to render a query plan invalid. For example, each entry in the plan cache can maintain information that helps to invalidate the cache entry in the presence of updates to the base statistics or updates to the physical database design. This includes information such as which indexes were used in the query plan and which statistics were used by the optimizer in generating the query plan.

Although recompilations are sometimes necessary or useful, the overhead of such recompilations should be minimized. Therefore, system 100 includes an incremental repair component 108 that can be configured to utilize the existing execution plan of the query (non-optimal or non-executable due to recent changes in statistics, physical design or metadata) as the "seed" that is "repaired" through local changes to the plan. Incremental repair component 108 can be configured to establish a new or repaired query plan 110 that is executable and often similar to the optimal plan that would have resulted from a traditional recompilation. The new query plan 110 can be returned to the plan cache of the database 102 as a repaired plan and becomes the current or existing plan (also referred to as physical plan).

There are various dimensions in evaluating a repair technique, which can include the overheads incurred, the quality of the repaired plan and the generality of the technique. Thus, incremental repair component 108 can provide different repair techniques to achieve one or more of the various dimensions. One technique is referred to as local repair, which makes the smallest amount of changes to the original query plan to produce a new plan by only looking at the leaf nodes of the query for which there has been a statistics change or a physical database change. Another technique is a global repair, which is a more general version of the local repair. Global repair provides a new plan having the best available implementation algorithms for all operators in the current query plan. The difference between the local repair plan and the global repair plan is the implementation algorithms considered for all the operators. Another technique is local recompilation, which can fully optimize fragments from the current query plan in order to derive the new plan. For local recompilation, incremental repair component 108 can be configured to determine a sub-tree of an existing plan and re-optimize only that sub-tree. For example, incremental repair component 108 can re-compile beginning with a least common ancestor of the updated relations.

A repair technique can also be a test to determine the need for recompilation. A full recompilation might not be resorted to unless there is some evidence that the original plan is no longer optimal or if a threshold has been reached or exceeded in conjunction with a statistics change. Further information regarding the various repair techniques will be discussed in further detail below.

A threshold-based policy can be utilized to determine when to recompile queries. The threshold can be utilized to characterize or track the amount of updates to the database and/or the amount of update activity to relations in the database. For example, when a table is updated (in conjunction with a statistics change) by more than a threshold value (e.g., 20%, 25%, 35%, and so forth) (and the corresponding statistics have been updated), a query that references the table might be automatically recompiled. Having such a large threshold might be needed because the overhead associated with recompilation is large. The threshold can be a global number that is used for all queries. However, with the disclosed techniques, repair to query plans can be implemented with a low threshold (e.g., 3%, 5%, 10%, and so on). As such, repair techniques can be utilized to quickly "fix" the existing plans, even if the updates are less than the original threshold value. This can be a least disruptive way in which repair techniques can be integrated in an existing system.

For example, two thresholds have been established, the first is a 5% threshold at or above which a repair is invoked and the second is a 20% threshold at or above which a recompilation is invoked. A modification to a database and a corresponding statistics update might change the query plan by 7%, which can trigger a repair to the existing query plan. Another statistic update changes the query plan by 10%, invoking another repair. Then there is an 8% change, at this time the total of the three changes exceeds the 20% threshold and, therefore, a recompilation is invoked. A recompilation would be automatically invoked if updates to database statistics produced a 21% change, for example.

Repair techniques can also be useful when recompilation costs are high. For example, a decision support system that has frequent reporting tasks that are coded in the form of stored procedures (and are cached in the plan cache). A change to a relevant database statistic could result in the recompilation of a large number of queries. In these cases, users might be willing to compromise on the "optimality" of the plans in order to reduce the excessive recompilation costs.

In some embodiments, the repair techniques can reuse more than one existing plan, related to a single query, to repair one or more plan cache. For example, there can be a multitude of query plans for a single query saved in a cache. If one or more of these query plans are rendered invalid or less than optimal, system 100 or incremental repair component 108 can review all the saved query plans and use different (or the same) repair techniques for each query plan that is being repaired, which can be all the query plans or a subset of the query plans.

Figure 2:
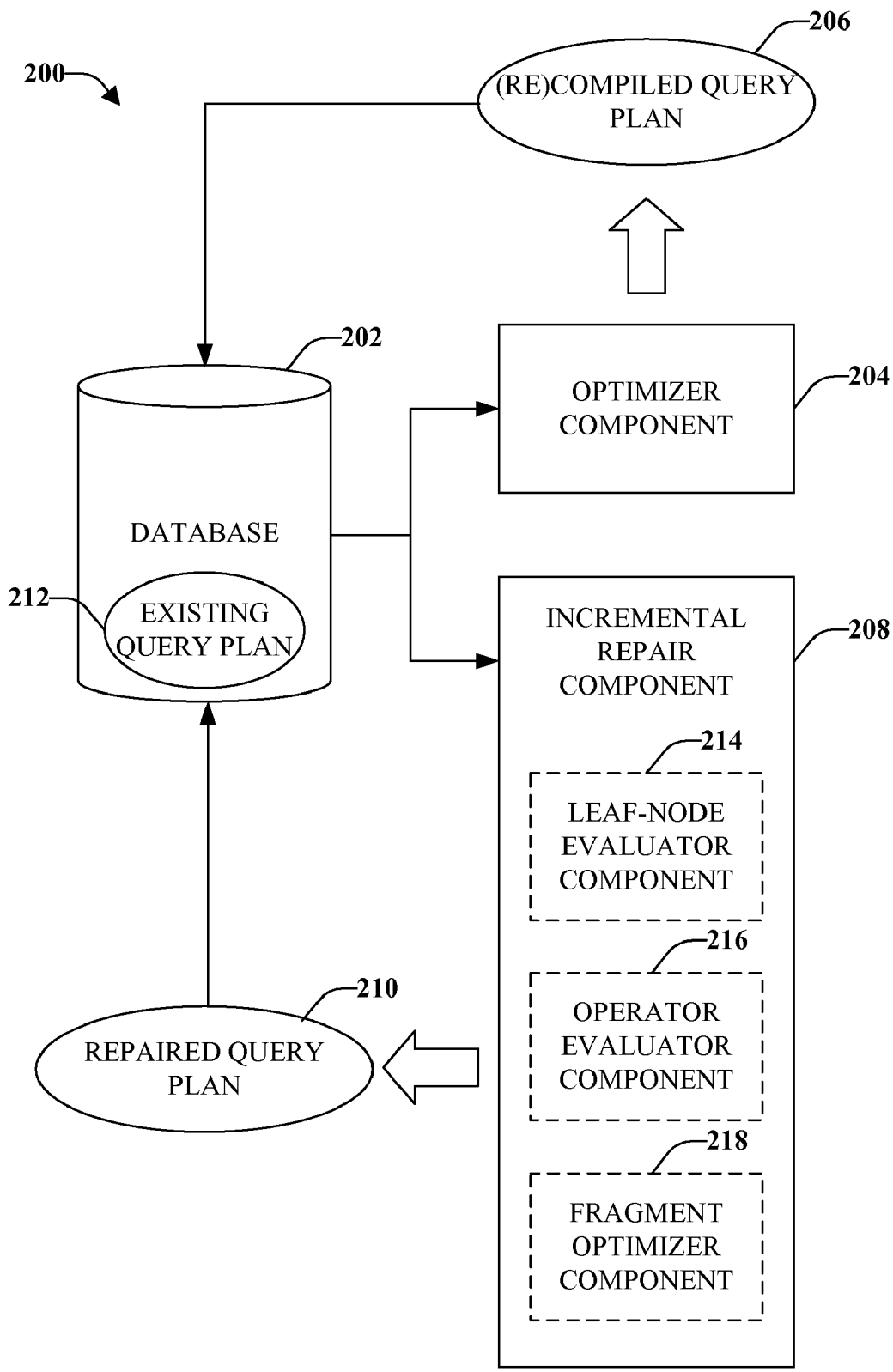
FIG. 2 illustrates a block diagram of a system that facilitates incremental repair of existing query plans utilizing various repair techniques.

FIG. 2 illustrates a block diagram of a system 200 that facilitates incremental repair of existing query plans utilizing various repair techniques. System 200 provides incremental repairs to a physical query plan while mitigating the need for a full recompilation of the plan. Included in system 200 is a database 202 that can be utilized to store and organize data, for instance, through tables, columns, and rows. An optimizer component 204 can be configured to compile a query or recompile an existing query plan 212 (resulting in a recompiled query plan 206) and an incremental repair component 208 can be configured to repair the existing query plan 212, resulting in a new or repaired query plan 210. The optimizer component 204 and incremental repair component 208 interact with each other and with database 202 to selectively repair the existing query plan(s) and/or recompile a query plan. In some embodiments, the incremental repair component 208 is integrated with the optimizer component 204.

The optimizer component 204 can be configured to implement a query compilation process that can involve parsing an input SQL query to generate a logical plan. The logical plan can be simplified, which can involve operations such as view rewrite and selection push-down. The output of this phase is a simplified logical plan, which is the input to query transformation where the main optimization occurs. The main optimization process can have the following interface:

Optimize (LogicalPlan, PhysicalProperties)

The optimizer component 204 can be configured to receive or obtain the logical plan as an input along with the desired physical properties (e.g., sort order) to generate a physical plan. The optimization process can use transformation rules to explore the search space and generate a physical plan as its output. Transformation rules include exploration rules and implementation rules. Exploration rules generate equivalent logical expressions through appropriate transformations. Implementation rules assign implementation algorithms to the logical operators. For example, join commutativity can be implemented using exploration rules while assigning hash or a merge-join algorithm to a join operator is through utilization of an implementation rule. The optimizer component 204 can utilize a suitable cost model to choose the optimal plan. A key input to the optimizer component 204 can be statistics on the data and the physical database design. The optimality of the plan produced by the optimizer component 204 can be conditioned on the available database statistics and the physical database design. Therefore, if relevant database statistics are updated or the relevant physical database design is modified, the queries should be recompiled to retain an optimized query plan. This recompiled query plan 206 becomes the existing query plan 212. It should be understood that although a database 202 can include a multitude of query plans, only one is illustrated and discussed for purposes of simplicity.

The input to the incremental repair component 208 is the existing query plan 212 (sometimes also referred to as physical plan or seed plan). The existing plan 212 does not have to be valid (e.g., an index used by the plan has been dropped) in order to be repaired. Incremental repair component 208 can be configured to implement various repair techniques including local repair, global repair and local recompilation depending on the query plan that is being repaired.

A leaf-node evaluator component 214 associated with incremental repair component 206 can be configured to implement a local repair, which can implement the smallest amount of changes to plan P to produce a new physical plan (e.g., repaired plan 210). Leaf-node evaluator component 214 can evaluate the leaf nodes of the query that has undergone a statistics change or physical database change and re-compute the access methods for those tables. Through implementation of the lead-node evaluator component 214, the current query plan can continue to use the better available access method at each leaf node in the presence of updates to statistics and the physical database design. Further details regarding techniques utilized by leaf-node evaluator component 214 will be discussed below with reference to FIG. 3.

Also associated with incremental repair component 208 can be an operator evaluator component 216 that can be configured to evaluate a set of plans that have a similar join order as the current physical plan P. A difference between the current physical plan P and the repaired query plan might be the implementation algorithms considered for the operators. The global repair technique can be a more general version of the local repair technique. In general, a global repair technique can detect many common patterns of changes (e.g., suboptimal algorithms, changes in the physical database design, and so forth). Further details relating to global repair will be provided below with reference to FIG. 4.

A fragment optimizer component 218 can also be associated with incremental repair component 208. Fragment optimizer component 218 can be configured to implement a local recompilation technique, which can mitigate overheads by fully optimizing fragments from the previous plan to derive the new plan. A local recompile approach re-optimizes a sub-expression of the plan and reuses the remainder of the original plan to construct the new plan. An underlying assumption in this scheme is that updates to the relation are likely to affect only the sub-expression being recompiled.

To fully appreciate the repair techniques (e.g. local repair, global repair, local recompilation) that will be discussed below with reference to FIGS. 3, 4, and 5, some primitives will now be discussed that can be utilized to build the various repair techniques (e.g., local repair, global repair and local recompilation).

GetPlanProperties(P)—Returns the physical properties requested at the output of the physical plan rooted at P.

GetLogicalExpr(P)—This module has as an input a physical plan P and generates a logical expression that preserves the join ordering in P, such as by ignoring any enforcers such as sort nodes in the physical plan. For example, if the input plan P is (Merge Join (Sort (HashJoin (Scan A, Scan B), Scan C)), the output logical expression would be Join (Join (A,B), C).

FindBestImplementation(L, phyProp)—Given a logical plan L and the desired physical properties (e.g., sort order), this module can compute the best physical implementation of L. This can be implemented by running Optimize with only the implementation rules turned on. Exploration rules might not be evaluated.

Replace(P, P1, P2)—replaces the subplan P1 in a physical plan P with the subplan P2. The Replace might result in a valid plan if P1 and P2 have the same properties (e.g., joined tables, projected columns, sort order).

FIG. 3 illustrates an exemplary algorithm 300 that can be utilized for a local repair technique in accordance with the various embodiments. The algorithm 300 can be utilized by leaf-node evaluator component 214 to determine a replacement access method at each leaf node when there are updates to statistics and/or the physical database design. However, it should be understood that various other algorithms, methods, and/or techniques could be employed to implement a local repair technique.

The following example will illustrate the local repair technique and an algorithm 300 that can be utilized with the local repair technique. A query plan (R1⋈R2) uses an index I1 (A,B,C), and its associated sort order, as the access method for relation R1 and a merge join is utilized as the join algorithm. Index I1 is dropped from the query, rending the existing query plan invalid or non-optimal. There are two alternative index paths available: index I2 (B,C,A) and index I3 (A,B,C,D). Either of these indexes could be utilized for the query plan instead of index I1 (which needs repair). However, since the associated sort order of index I1 is utilized by the query plan, if leaf-node evaluator component 214 chooses to replace index I1 with index I2, an additional sort operator would need to be included to enforce the correct ordering. Therefore, leaf-node evaluator component 214 might choose index I3, which has a sort order equivalent to the sort order of index I1, and replace index I1 without needing an additional sort operator.

In the above example, the local repair strategy, implemented by leaf-node evaluator component 214, would recompile the sub-expression (R1), with the appropriate desired physical properties (e.g., the sort order desired for the join). Thus, leaf-node evaluator component 214 can choose between using the index I3 and using the index I2 along with an appropriate sort. The decision can be made based on the alternative (either R2 or R3) that has a lower overhead, which would be R3 in this example since R3 does not need an additional sort operator. Leaf-node evaluator component 214 can make such a determination utilizing, for example, the FindBestImplementation routine.

FIG. 4 illustrates an exemplary algorithm 400 that can be utilized for a global repair technique in accordance with the one or more embodiments presented herein. The exemplary algorithm 400 can be utilized by operator evaluator component 216 to implement a global repair technique that can provide an algorithm for each of the operators in the current physical plan. However, it should be understood that various other algorithms, methods, and/or techniques can be employed to implement a global repair technique.

The global repair scheme can be more powerful than the local repair scheme discussed with reference to FIG. 3. That is to say, a plan that can be obtained by using a local repair scheme can be obtained by using a global repair scheme, however, a global repair scheme may result in a higher overhead. Additionally, a global repair scheme can change the implementation of operators in the physical plan (e.g., a join algorithm used for a particular join).

The following example will illustrate a global repair technique. A plan for a five-way join query is ((((R1⋈R2)⋈R3)⋈R4)⋈R5). An index nested loop (INL) join is utilized by the current plan to join with table R4. Table R3 has been updated (and the corresponding statistics have changed) and the updates might significantly alter the cardinality of the intermediate expression ((R1⋈R2)⋈R3), which serves as the outer of the INL join. The cardinality of this outer could increase to an extent that INL join is no longer the best join method to join with table R4. The operator evaluator component 216 can detect such a case and choose hash join, for example, through implementation of algorithm 400 (or another technique). If instead, the example is a symmetric case that begins with a hash join and the updates reduce the cardinality of the outer, the operator evaluator component 216 can determine that an INL join, for example, should be utilized to repair the query plan. In addition, other repairs can be made utilizing the disclosed repair strategies.

Figures 5, 6:
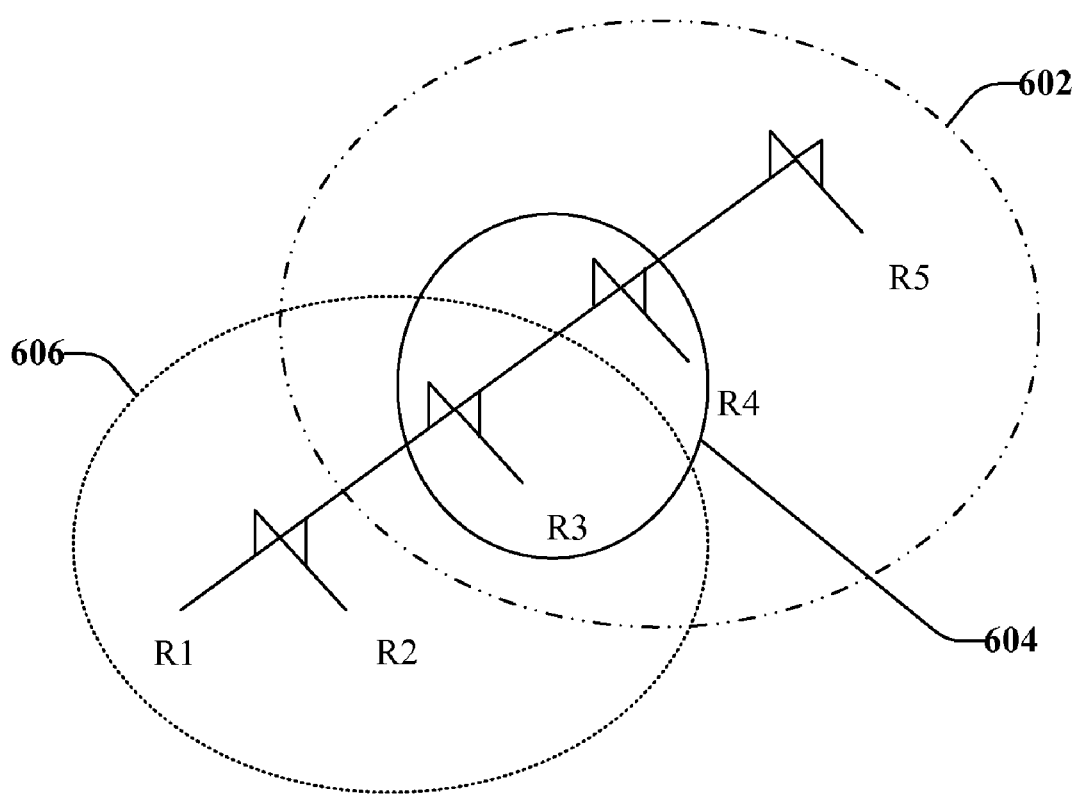
FIG. 5 illustrates an exemplary algorithm that can be utilized for a local recompilation technique according to one or more disclosed embodiments.
FIG. 6 illustrates candidate fragments for local recompilation according to the disclosed embodiments.

FIG. 5 illustrates an exemplary algorithm 500 that can be utilized for a local recompilation technique according to one or more disclosed embodiments. The exemplary algorithm 500 can be utilized by fragment optimizer component 218 to implement a local recompilation technique that can use exploration rules instead of invoking the optimizer (e.g., which can be invoked through both the local repair and global repair techniques). However, it should be understood that various other algorithms, methods, and/or techniques can be employed to implement a local recompilation technique.

The following example is provided to illustrate an exemplary algorithm. A join query (R1⋈R2⋈R3⋈R4⋈R5) has the execution plan shown in FIG. 6, which illustrates candidate fragments for local recompilation. For this example, the statistics relevant to relation R3 have been updated and for repair of the query, three fragments have been identified, which are fragment (R3⋈R4⋈R5), illustrated at 602; fragment (R3⋈R4), illustrated at 604; and fragment (R1⋈R2⋈R3), illustrated at 606.

Evaluating fragment (R3⋈R4⋈R5) 602 can indicate that the physical plan for (R1⋈R2) will be reused. A view V can be defined to represent the result of the join fragment (R1⋈R2). This view V need not be actually materialized, but can be created leveraging database support for hypothetical structures. Fragment optimizer component 218 can then optimize the query (V⋈R3⋈R4⋈R5), where view V replaces the join fragment (R⋈R2). The final query plan can be built by reusing the plan corresponding to the view V.

In the local recompilation technique, the optimizer might not explore the join orderings corresponding to the view V. This can be implemented by a suitable hinting mechanism to the optimizer that would force the user of a table scan for the view V instead of expanding it.

The second candidate for optimization is fragment (R3⋈R4) 604. However, this fragment (as well as fragment (R3⋈R4⋈R5) 602) might not be the best to implement in this repair scheme since the optimizer should have statistics on the hypothetical view V in order to compute the best available plan using the view. The optimizer can potentially create the statistics on the fly, but the amount of overhead involved in creating statistics might outweigh the optimization time saved by saving the plan for the prefix of the join.

Another candidate for optimization is fragment (R1⋈R2⋈R3) 606. If an optimal plan obtained for this expression is ((R3⋈R2)⋈R1) then the repair plan could be ((((R3⋈R2)⋈R1)⋈R4)⋈R5). A difference when compared to the other candidate fragments (R3⋈R4⋈R5) 602 and (R3⋈R4) 604 is that no new statistics on the intermediate nodes are utilized.

This scheme can be generalized by finding the largest common ancestor among all the updated relations in the query plan (e.g., Node A), and re-optimize that sub-expression rooted at Node A. The plan obtained can be combined with the remaining part of the original query plan to create a new "repaired" plan.

In some embodiments, the overhead for local recompilation might be higher than desired because a sub-expression could be a sizable fragment of the original query. However, the local recompilation might still be utilized if it provides query plans that have a high quality. This scheme can be illustrated when function computeLCA (P) returns the largest common ancestor of the updated relations. For a single update, the function can return the immediate join node that is the ancestor. This technique can utilize the Optimize interface to obtain the best available plan for the subexpression instead of utilizing the FindBestImplementation interface used by the local repair and the global repair techniques.

Figure 7:
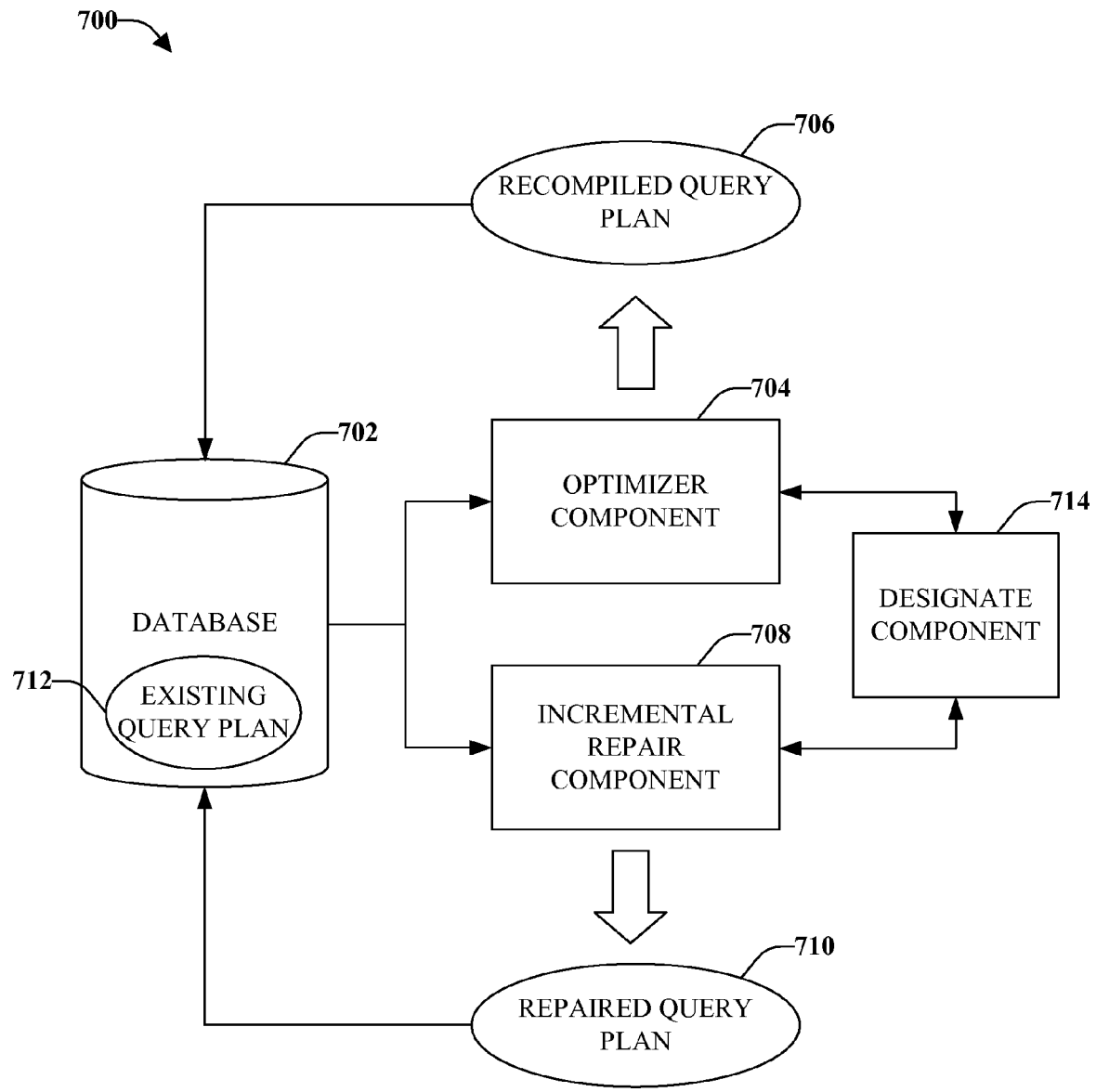
FIG. 7 illustrates a block diagram of a system that selectively repairs a current query plan or implements recompilation of the query plan.

FIG. 7 illustrates a block diagram of a system 700 that selectively repairs a current query plan or implements recompilation of the current query plan. There are a multitude of cases where repair techniques can find plans that are close to optimal (e.g., the current query plan) at a small fraction of the cost (time and money) incurred during full recompilation. However, repair techniques are not necessarily a replacement for query recompilation. Thus, system 700 combines repair techniques with recompilation and further, utilizes repair techniques as a test to determine the need for recompilation.

System 700 can include a database 702 that interfaces with an optimizer component 704 that can be configured to compile or recompile a current query plan 706. Database 702 can also interface with an incremental repair component 708 that can be configured to repair a query plan that has become obsolete, invalid, or non-optimal and produce a repaired query plan 710 from a current query plan 712. Also included in a system can be a designate component 714 that can be associated with either or both incremental repair component 708 and optimizer component 704 to selectively determine whether a query should be repaired or whether a recompilation should be processed.

Various techniques can be utilized by designate component 714 to designate when recompilation should be performed, such as a threshold based policy, which can be utilized to facilitate deciding when to recompile queries. The threshold can be utilized to track the number of updates to the database or the amount of update activity to relations in the database. For example, repair techniques can be utilized to quickly fix query plans whenever the statistics updates are less than a threshold value. This can be a less disruptive way of integrating repair techniques since it can help to verify that the query plans should be better than the current approach. In some embodiments, utilizing repair techniques in the situations noted above can be potentially useful even if the statistics have not been updated. For example, changes in the cardinality of a table can render a plan non-optimal, even though the data distribution has not changed. For example, a heuristic that can be used by database systems is to trigger a recompilation if the changes in the base table have exceeded a threshold (e.g., 10-20%) and if the corresponding statistics have been updated. Recompilations could be initiated immediately after a corresponding statistics update (or a physical database change) or it could be deferred until the next time the query is re-executed (e.g., when requested by a user).

In some embodiments, repair techniques can be utilized to mitigate excessive recompilations. By "repairing" the previous plan, reliable query plans can be found while expending low overhead. For example, when an index is dropped, a valid plan can be found using a repair technique (e.g., global repair, local repair, local recompilation).

Designate component 714 can be configured to utilize repair techniques as a test to determine the need for recompilation. For example, the original query plan can be repaired and designate component 714 can make a determination whether the repaired plan is different from the original plan. If different, a recompile might be issued. If the repaired plan is substantially the same as the original plan, the original plan might be reused, with the information included in the repair query. Thus, designate component 714 can mitigate unnecessary recompilation and might not resort to full recompilation unless there is some evidence that a recompilation is necessary to produce the desired result. Therefore, if the repair technique produces a better plan, then, since at least one better plan exists, recompilation is performed. If the original plan is still optimal, a recompilation might not be performed, since there might not be evidence that a better plan exists.

In some embodiments, designate component 714 can utilize a two-tier threshold-based policy to designate when to repair or recompile a query. For example, when a table is updated (in conjunction with a statistics change) by more than a threshold value (e.g., 22%, 30%, 37% and so forth), a query that references the table might be automatically recompiled. Having such a large threshold might be needed because of the large overhead associated with recompilation. However, with the disclosed techniques, a lower threshold (e.g., 2%, 6%, 10%, and so one) can designate when the query plan should be repaired. Thus, designate component 714 can designate repairing the current query plan when the low threshold is met or exceed and designate a recompilation when the high threshold is met or exceeded.

Figure 8:
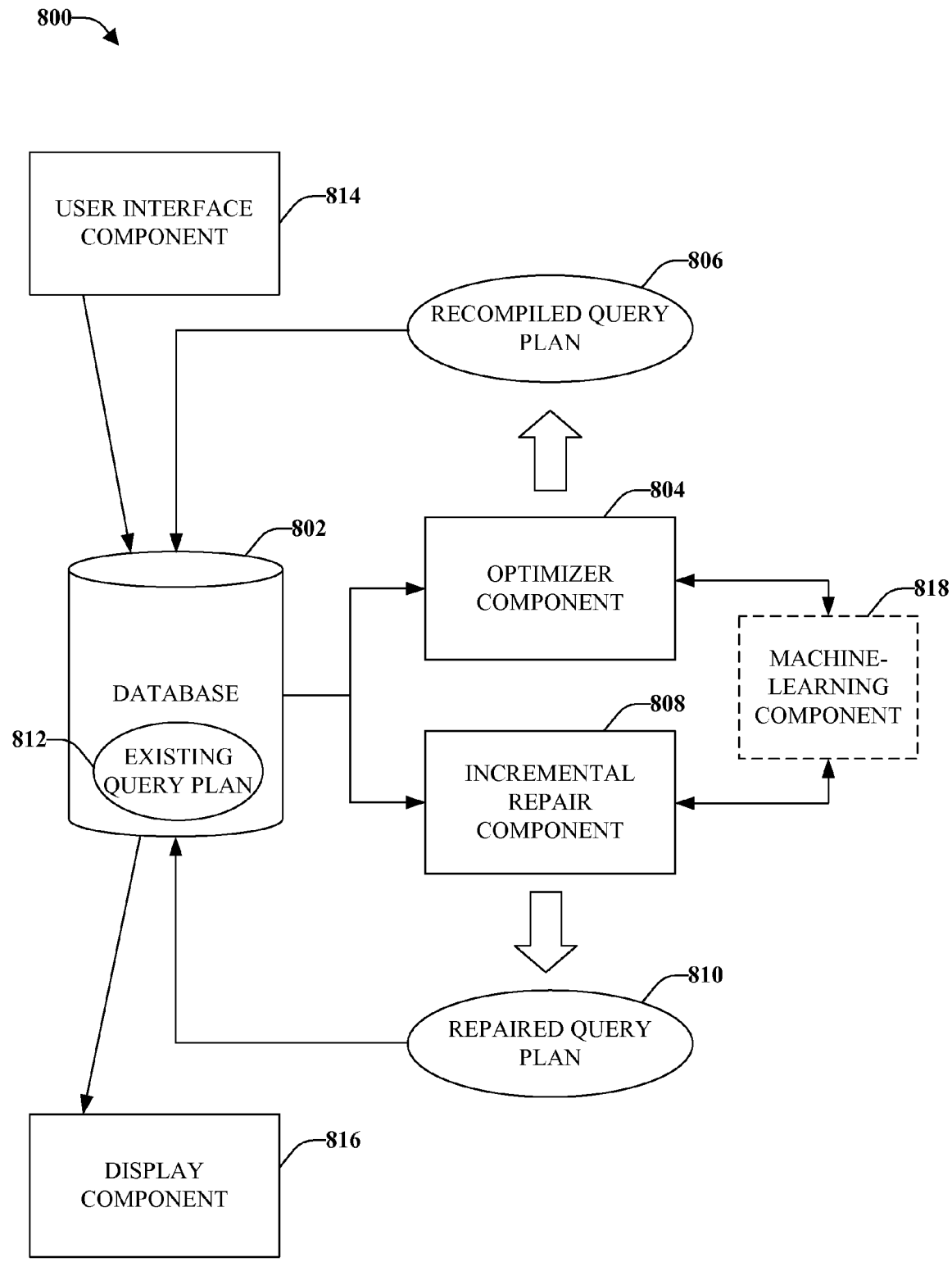
FIG. 8 illustrates a system for selectively repairing a query plan and seamlessly presenting the output of such query results to a user, whereby the repairs to the query plan are transparent to the user.

FIG. 8 illustrates a system 800 for selectively repairing a query plan and seamlessly presenting the output of such query results to a user, whereby the repairs to the query plan are transparent to the user. System 800 includes a database that interfaces with an optimizer component 804 that can be configured to facilitate compilation/recompilation of a query plan 806 and an incremental repair component 808 that can be configured to create a repaired query plan 810. The repaired query plan 810 can be developed from an existing query plan 812.

A user can interface with database 802 through, for example, a user interface component 814. For example, the user interface component 814 can be, but is not limited to being, a keyboard, a mouse, a pressure-sensitive screen, a graphical user interface, a microphone, and voice recognition software. The user may desire base data included in database 802 to be compiled and formatted in a particular format, as provided by the compiled query plan. The results of the original query plan, repaired query plan, and/or recompiled query plan can be presented to the user through a display component 816, such as a graphical user interface.

In some embodiments, a machine-learning component 818 can be utilized with the disclosed techniques. The machine-learning component 818 can employ artificial intelligence based systems (e.g., explicitly and/or implicitly trained classifiers) in connection with performing inference and/or probabilistic determinations and/or statistical-based determinations with respect to selection of a type of repair to perform or whether a recompilation should be processed. As used herein, the term "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, and so forth) can be employed in connection with performing automatic and/or inferred action in connection with the disclosed repair techniques.

In view of the exemplary systems shown and described above, methodologies that may be implemented in accordance with the disclosed subject matter are provided. While, for purposes of simplicity of explanation, the methods are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methods described hereinafter. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methods to various devices. Those skilled in the art will understand and appreciate that a methodology could alternatively be represented as a series of interrelated states or events, such as in a state diagram.

Figure 9:
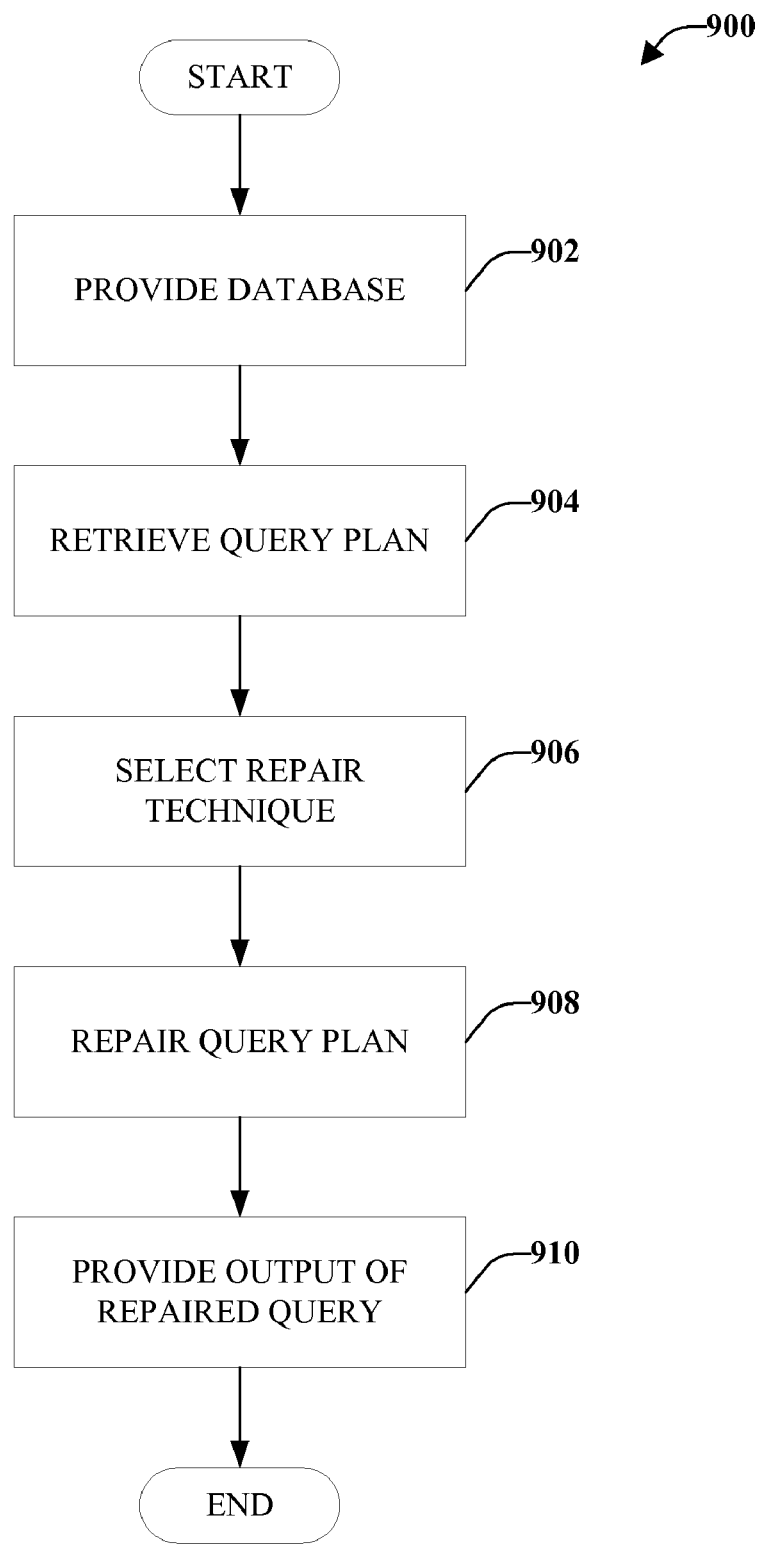
FIG. 9 illustrates a method for selectively repairing a query plan utilizing an incremental repair technique.

FIG. 9 illustrates a method 900 for selectively repairing a query plan utilizing an incremental repair technique. At 902, a database is provided, wherein the database includes one or more columns that can be employed to index content of the database. For example, the database can include information relating to employees in a factory, and columns therein can include employee names, date of hire, hourly wages, hours worked per week, title, and so forth. An accounting department might be interested in compiling information for payroll purposes while a human resource department might be interested in compiling information relating to promotions, vacations, and so forth. Therefore, each department might compile a query and save such query as a plan, which can be utilized each time the information is desired, without requiring recompilation of the query. However, there might be situations when a query plan is rendered invalid or less than optimal, such as when various data is removed from the database in conjunction with a statistics update. In these situations, the current query can be repaired and/or recompiled, depending on the integrity of the resulting query information.

At 904, a query plan is retrieved from the database. This query plan can be a current valid plan, which can be immediately presented to a user, upon request. The query plan may also be a current query plan that has been rendered invalid or non-optimal (e.g., damaged query plan, changes to the base data statistics, an index is dropped, and so forth) due to changes to the base data or the database statistics. Based in part on the changes to the database statistics, physical design, metadata, and so forth, a repair technique is selected at 906.

There are various ways to repair the current query without resorting to full recompilation (e.g., reuse parts of the current plan rather than discarding it entirely when it is invalidated). One way is to optimize the query but restrict the search space based on the existing plan. Another technique is to fully optimize a smaller sub-query in order to repair the current plan. Repair techniques can find plans that are similar to the optimal plan (e.g., current pan) but at a low overhead and such repair techniques can include local repair, global repair or local recompilation.

The selected repair technique can be applied to the existing query plan and repair of the query plan can be performed, at 908. The repair can reuse one or more portions or sub-portions of the existing query plan. The output of the repaired query plan can be presented to the user, at 910, and can become the current query plan. As such, the user might not be aware that repair of the query occurred. Thus, repairs to the query plan can be seamless and transparent to the user while providing low associated overhead costs (e.g., time and money).

Figure 10:
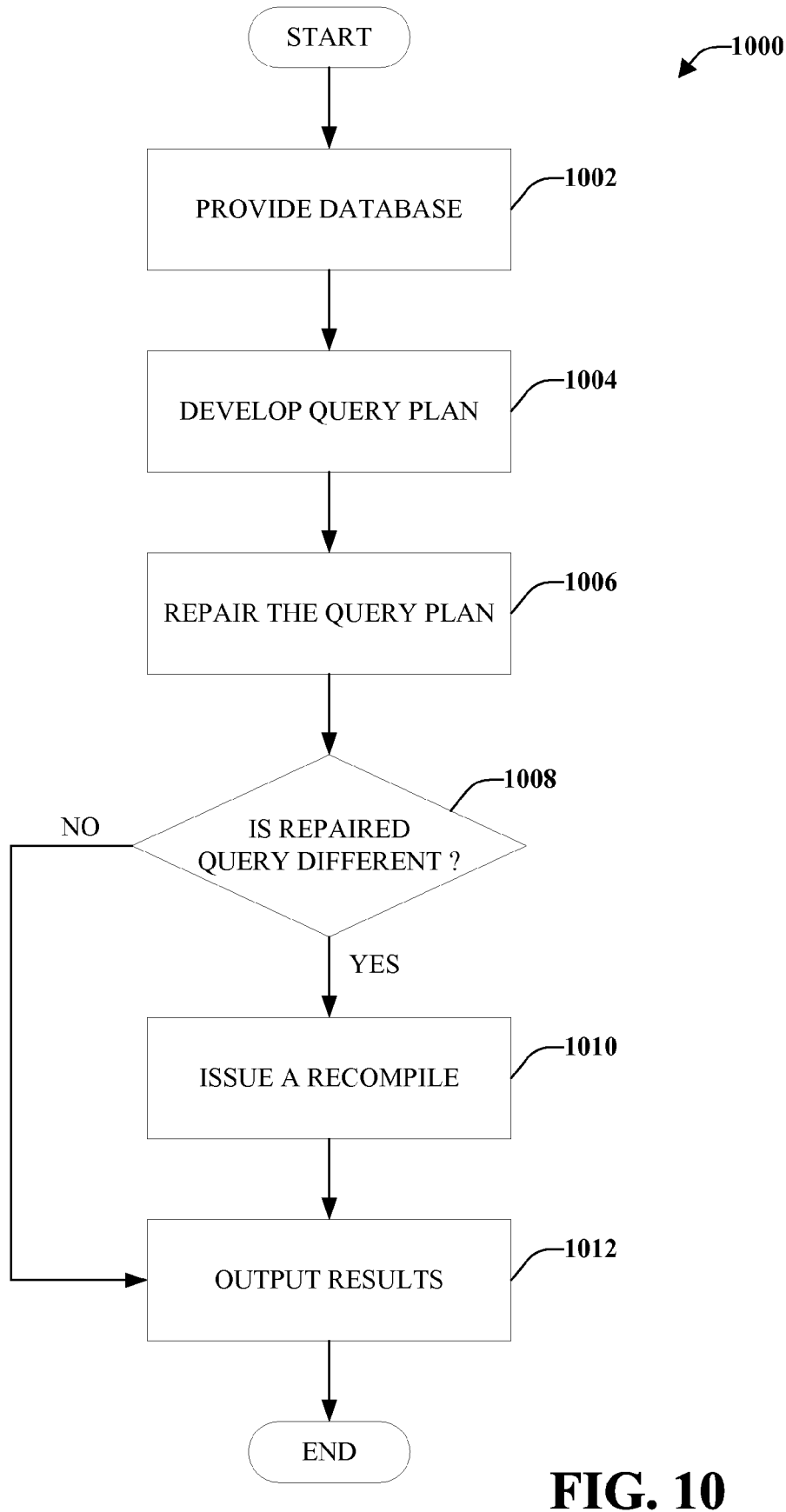
FIG. 10 illustrates a method for selectively determining whether a query plan should be repaired or recompiled.

FIG. 10 illustrates a method 1000 for selectively determining whether a query plan should be repaired or recompiled. At 1002, a database is provided and, at 1004, a query plan is developed. The information included in the developed plan can be manually selected by a user by way of a user interface and/or automatically selected by a computing component, intelligent or otherwise. If the query plan becomes invalid or non-optimal, it is repaired, at 1006, using a repair technique, such as local repair, global repair or local recompilation.

A determination is made, at 1008, whether the repaired query is different from the original plan (e.g., produces a different output). If the determination is "YES", a recompile of the query plan is initiated, at 1010. The output of the recompiled query plan is presented to the user, at 1012. If the determination, at 1008, is "NO", the query plan is not different from the original plan, the output of the repaired query plan is presented to the user, at 1012.

Figure 11:
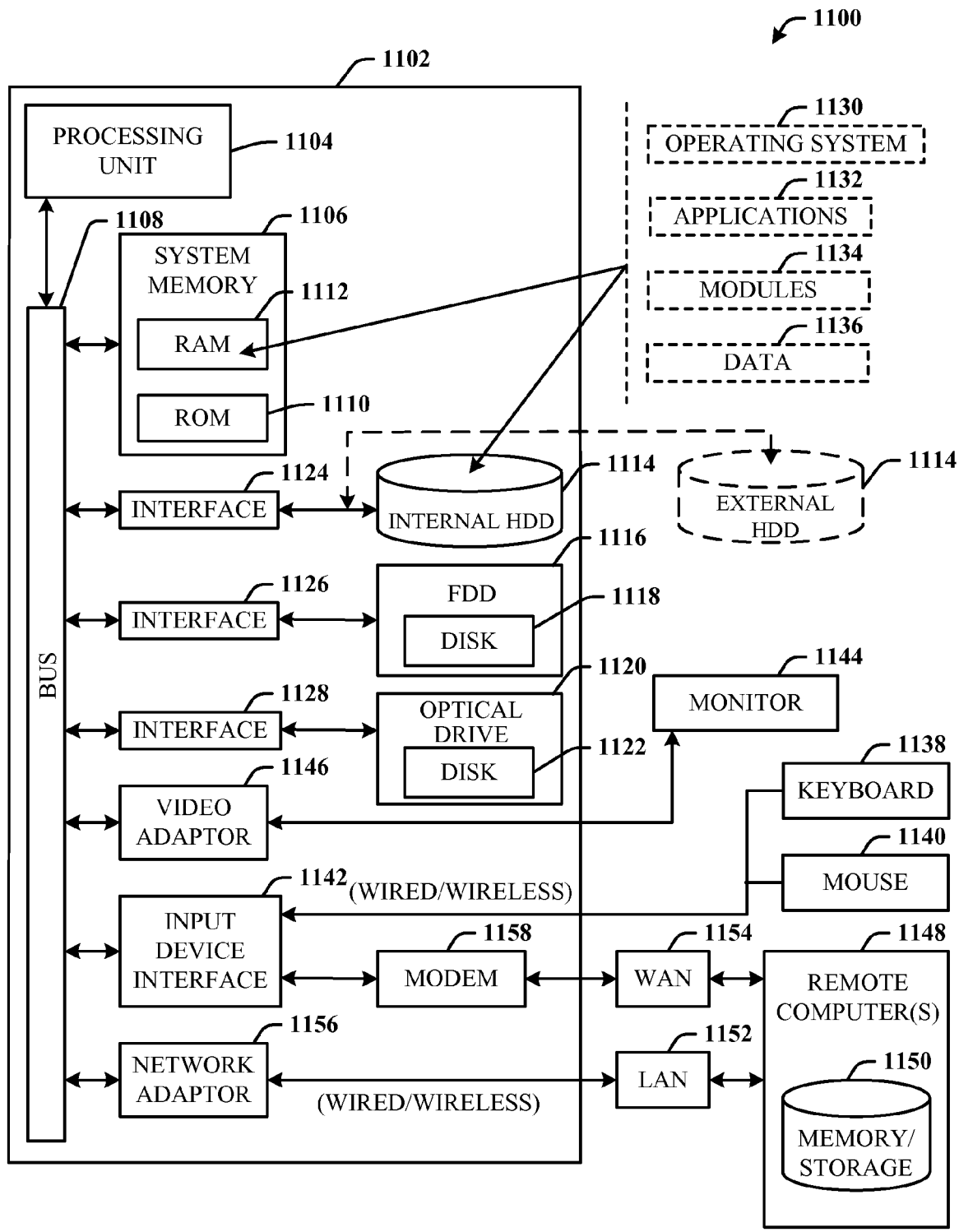
FIG. 11 illustrates a block diagram of a computer operable to execute the disclosed embodiments.

Referring now to FIG. 11, there is illustrated a block diagram of a computer operable to execute the disclosed architecture. In order to provide additional context for various aspects disclosed herein, FIG. 11 and the following discussion are intended to provide a brief, general description of a suitable computing environment 1100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer typically includes other peripheral output devices (not shown), such as speakers, printers, etc.

The computer 1102 may operate in a networked environment using logical connections through wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
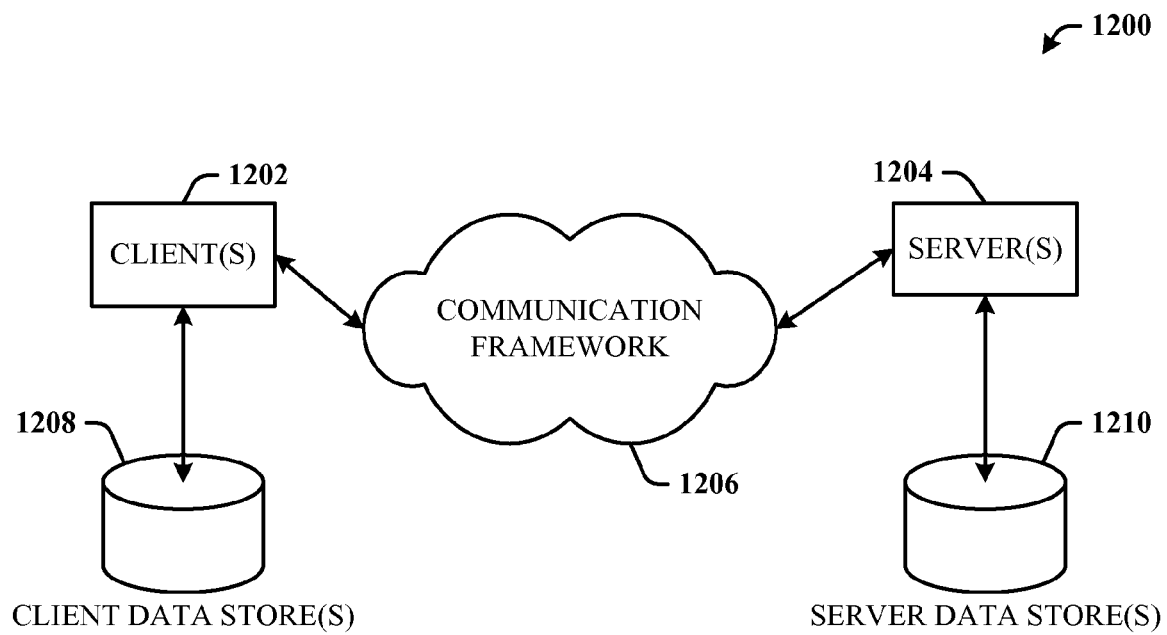
FIG. 12 illustrates a schematic block diagram of an exemplary computing environment operable to execute the disclosed embodiments.

Referring now to FIG. 12, there is illustrated a schematic block diagram of an exemplary computing environment 1200 in accordance with the various embodiments. The system 1200 includes one or more client(s) 1202. The client(s) 1202 can be hardware and/or software (e.g. threads, processes, computing devices). The client(s) 1202 can house cookie(s) and/or associated contextual information by employing the various embodiments, for example.

The system 1200 also includes one or more server(s) 1204. The server(s) 1204 can also be hardware and/or software (e.g., threads, processes, computing devices). The servers 1204 can house threads to perform transformations by employing the various embodiments, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated through a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on a computer-readable storage medium that facilitates incremental repair of existing query plans, the system comprising:
   an optimizer component that generates a query plan and designates the generated query plan as an existing query plan;
   a designate component that selectively determines whether to repair or recompile the existing query plan, wherein the determination to repair is based on meeting or exceeding a first threshold level and the determination to recompile is based on meeting or exceeding a second threshold level, wherein further the first threshold level and the second threshold level comprise an update activity in a database; and
   an incremental repair component that receives the existing query plan and selectively repairs the existing query plan utilizing an incremental repair technique, the incremental repair component including an evaluator component for evaluating the leaf-nodes of the existing query plan against any changes to a database.

2. The system of claim 1, wherein the incremental repair technique reuses at least a sub-portion of the existing query plan through at least one of a local repair, a global repair and a local recompilation.

3. The system of claim 1, wherein the incremental repair component repairs the existing query plan utilizing a local repair to provide a best available access method to at least one leaf node contained in the existing query plan.

4. The system of claim 1, wherein the incremental repair component repairs the existing query plan utilizing a global repair that provides a best available implementation algorithm for at least one operator in the existing query plan.

5. The system of claim 1, wherein the incremental repair component determines a sub-tree of the existing plan to re-optimize.

6. The system of claim 1, wherein the designate component determines whether the repaired query plan should be presented to a user or whether a recompile should be performed.

7. The system of claim 1, wherein the incremental repair component receives a plurality of existing query plans and selectively repairs at least a subset of the plurality of existing query plans utilizing the incremental repair technique.

8. The system of claim 1, further comprising a display component that displays the output of the repaired query plan.

9. The system of claim 1, further comprising a machine-learning component that determines whether the query plan should be repaired or recompiled.

10. A computer-implemented method of selectively repairing an invalidated query plan, the method comprising:
    receiving a request to repair an existing query plan;
    evaluating the leaf-nodes of the existing query plan against any changes to a database;
    determining whether to repair the existing query plan or recompile based on a two-tier threshold based policy that comprises a first threshold and a second threshold, wherein the determination to repair is based on meeting or exceeding a first threshold level and the determination to recompile is based on meeting or exceeding a second threshold level, wherein further the two-tiered threshold based policy characterizes the amount of update activity in a database;
    selecting a repair technique, the selection comprising choosing at least one of a local repair technique, a global repair technique and a local recompilation technique; and
    applying the repair technique to the existing query plan.

11. The method of claim 10, further comprising reusing at least a portion of the existing query plan in the repaired query plan.

12. The method of claim 10, further comprising:
    analyzing the repaired query plan;
    determining if the repaired query plan is different from the existing query plan; and
    issuing a recompile of the existing query plan if the repaired query plan is different from the existing query plan.

13. The method of claim 12, further comprising presenting the repaired query plan to a user if the repaired query plan is not different from the existing plan.

14. A computer executable system embodied on a computer-readable storage medium that provides repair of query plans, comprising:
    means for receiving a request for a database information;
    means for retrieving a query plan that includes the database information;
    means for determining whether to repair or recompile the query plan, wherein the determination to repair is based on meeting or exceeding a first threshold level and the determination to recompile is based on meeting or exceeding a second threshold level, wherein further the first threshold level and the second threshold level comprise changes to a database;
    means for repairing the retrieved query plan, comprising:
       means for performing a local repair;
       means for performing a global repair; and
       means for performing a local recompilation; and
          means for presenting a result of the repaired query plan in response to the received request.

15. The computer executable system of claim 14, further comprising:
    means for determining that the repaired query plan is ineffective; and
    means for recompiling the retrieved query plan.

16. The method of claim 10, wherein the local repair technique comprises a change to the query plan to produce a repaired query plan by evaluating a leaf node of the query plan for which there has been a statistics change or a physical change.

17. The method of claim 10, wherein the global repair technique comprises a change to the query plan to produce a repaired query plan by evaluating implementation algorithms for all operators of the query plan.

* * * * *